United States Patent [19]

Reeh et al.

[11] 4,336,167

[45] Jun. 22, 1982

[54] QUICK-SETTING EPOXY RESIN COMPOUNDS

[75] Inventors: Ulrike Reeh, Munich; Hans Denk, Gauting, both of Fed. Rep. of Germany

[73] Assignee: Siemens Aktiengesellschaft, Munich, Fed. Rep. of Germany

[21] Appl. No.: 254,608

[22] Filed: Apr. 16, 1981

[30] Foreign Application Priority Data

Apr. 25, 1980 [DE] Fed. Rep. of Germany ....... 3016097

[51] Int. Cl.$^3$ ...................... C08G 59/68; C08G 59/42
[52] U.S. Cl. ...................................... 523/451; 528/361
[58] Field of Search .................. 528/281, 361, 92, 89; 260/18 EP, 31.8 E, 30.6 R

[56] References Cited

U.S. PATENT DOCUMENTS 3,477,971 11/1969 Allen et al. ...................... 528/92 X
4,013,987  3/1977 Foster ............................... 528/92 X
4,178,274 12/1979 Denk et al. ..................... 528/361 X Primary Examiner—Earl A. Nielsen
Attorney, Agent, or Firm—Kenyon & Kenyon

[57] ABSTRACT

The invention relates to quick-setting epoxy resin compounds of carboxylic-acid anhydrides, diglycidyl esters and zinc octoate as accelerator, dissolved in a low-molecular acid ester and optionally, an organic phosphorus compound. Particularly well suited diglycidyl esters are hexahydrophthalic-acid diglycidyl ester, phthalic-acid diglycidyl ester, tetrahydrophthalic-acid diglycidyl ester and aliphatic diglycidyl esters. The epoxy resin compounds can be used for casting resin and molding compounds as well as for adhesive and impregnating materials. They find particular use for electrical components and modules.

9 Claims, No Drawings

QUICK-SETTING EPOXY RESIN COMPOUNDS

BACKGROUND OF THE INVENTION

The present invention relates to quick-setting epoxy resin compounds based upon diglycidyl compounds, carboxylic-acid anhydrides, low-molecular weight acid esters, metal salts of organic acids and auxiliary agents and additives.

The known epoxy resin compounds on the basis of diglycidyl esters which can be hardened with acid anhydrides and are customarily accelerated with amines, such as tertiary amines, BF$_3$-amine complexes or free carboxylic acids, have a relatively long gelling time.

SUMMARY OF THE INVENTION

It is an object of the present invention to harden epoxy resin compounds of the diglycidyl ester/acid anhydride type quickly, so that a mold occupancy or residence time as short as possible is achieved.

According to the invention, this and other objects are achieved with epoxy resin compounds which contain, besides carboxylic acid anhydrides, diglycidyl esters and, as accelerator, zinc octoate, dissolved in a low-molecular weight acid ester, optionally together with an organic phosphorus compound. Such epoxy resin compounds have set or gelled at 120° C. even after 2 to 3 minutes to such an extent that, for example, components encapsulated therewith can be removed from the mold without damage.

Epoxy resin compounds according to the present invention are particularly suitable for covering, encapsulating, cementing and impregnating electrical components. Through suitable choice of the starting materials together with auxiliary agents and additives, molding compounds, casting resins, adhesive and impregnating resins can be made therefrom.

Suitable diglycidyl esters which have been found especially suitable are hexahydrophthalic-acid diglycidyl esters, phthalic-acid diglycidyl esters, tetrahydrophthalic-acid diglycidyl esters and aliphatic diglycidyl esters.

A special embodiment of this invention is a transparent, liquid casting resin compound consisting of hexahydrophthalic-acid diglycidyl ester, hexahydrophthalic-acid anhydride, hexahydrophthalic-acid monoethyl ester or an acid ester of the formula

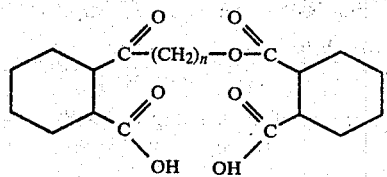

with n=1 to 4, zinc octoate and diphenyl phosphite. The casting resin compound can be worked at room temperature. Surprisingly, the moldings made therefrom show no appreciable reduction of the light transmittancy even after storage at a temperature of 120° C. for ½ year. The above-mentioned properties are particularly advantageous for using this casting resin for opto-electronic components such as light-emitting diodes, displays, photo transistors and photo diodes.

In addition to the required light-genuineness for opto-electronic applications, the quick setting makes economical production possible, which is of advantage especially for the continuous production of cast-in components in large quantities.

DETAILED DESCRIPTION OF THE INVENTION

The invention is explained in further detail by the following illustrative examples.

EXAMPLE 1

Preparation of the Casting Resin Premixture
(Component A)

100 parts by weight of hexahydrophthalic-acid diglycidyl esters with an epoxy value of 0.65±0.01 mol/100 g are heated to 60° C., and 0.00015 parts by weight of the optical brightener Waxoline Violet A ® are mixed-in at this temperature. This mixture is cooled down to room temperature before it is mixed with component B.

Preparation of the Casting Resin Premixture
(Component B)

12 parts by weight of the acid ester hexahydrophthalic-acid monoethyl ester (if it is crystallized, it is melted at 35° to 40° C.) are mixed at room temperature with 6 parts by weight zinc octoate and 7 parts by weight diphenyldecyl phosphite. To this mixture, 85 parts by weight of the hardening agent hexahydrophthalic-acid anhydride, melted at 80° C., are admixed. This mixture is cooled down to room temperature.

Preparation of the Casting Resin Compound 100 parts by weight of component A are homogeneously mixed at room temperature with 110 parts by weight of component B and, if indicated, vented.

EXAMPLE 2

Preparation of the Casting Resin Premixture
(Component A)

100 parts by weight of hexahydrophthalic-acid diglycidyl esters with an epoxy value of 0.65±0.01 mol/100 g are heated to 60° C., and 0.00015 parts by weight of the optical brightener Waxoline Violet A ® are mixed-in at this temperature. Before it is mixed with component B, this mixture is cooled down to room temperature.

Preparation of the Casting Resin Premixture
(Component B)

11.5 parts by weight of the acid ester of 1 mol ethylene glycol and 2 mol hexahydrophthalic-acid anhydride (the crystallized ester is melted at 100° to 120° C.) are mixed with 6 parts by weight zinc octoate and 7 parts by weight diphenyldecyl phosphite at 40° to 60° C. To this mixture are admixed 85 parts by weight of the hardening agent hexahydrophthalic-acid anhydride, melted at 80° C. This mixture is cooled down to room temperature.

Preparation of the Casting Resin Compound 100 parts by weight of component A are homogeneously mixed at room temperature with 109.5 parts by weight of component B and are, if indicated, vented.

This casting resin compound with hexahydrophthalic-acid diglycidyl ester as the epoxy compound sets several times faster at 150° C. than the casting resin compound which contains the cycloaliphate (3,4- epoxy-cyclohexylmethyl-3,4-epoxy)cyclohexane carboxylate) as the epoxy compound, as can be seen from the following Table.

| Resin | Gelling Time (Min.; Seconds) | | | |
|---|---|---|---|---|
| | at 150° C. | at 140° C. | at 130° C. | at 120° C. |
| Cycloaliphatic Epoxy Resin | 1' 46" | 2' 48" | 5' | 8' |
| Hexahydrophthalic-acid glycidyl ester | 24" | 45" | 1' 30" | 1' 35" |

EXAMPLE 3

Preparation of the Casting Resin Premixture (Component A)

100 parts by weight of hexahydrophthalic-acid diglycidyl esters with an epoxy value of 0.65±0.01 mol/100 g are heated to 60° C. and 0.00015 parts by weight of the optical brightener Waxoline Violet A ® are mixed-in at this temperature. This mixture is cooled down to room temperature before the component B is mixed in.

Preparation of the Casting Resin Premixture (Component B)

14 parts by weight of the acid ester, prepared from 1 mol 1,2-propane diol and 2 mol hexahydrophthalic-acid anhydride (the ester is melted at 80° C.), are mixed at 60° C. with 6 parts by weight zinc octoate and 7 parts by weight diphenyldecyl phosphite. Into this mixture are mixed 83 parts by weight of the hardening agent hexahydrophthalic-acid anhydride. This mixture is cooled down to 40° C.±5° C.

Preparation of the Casting Resin Compound 100 parts by weight of component A are homogeneously mixed at room temperature with 110 parts by weight of component B (40° C.±5° C.) and, if indicated, vented.

EXAMPLE 4

Casting Resin Premixture (Component A)

Hexahydrophthalic-acid diglycidyl ester with an epoxy value of 0.65±0.01 mol/100 g.

Preparation of the Casting Resin Premixture (Component B)

21 parts by weight of the acid ester, prepared from 1 mol 3-methyl pentane diol-1,5 and 2 mol methylhexahydrophthalic-acid anhydride (the ester is melted at 90° C.) are mixed with 6 parts by weight zinc octoate and 7 parts by weight diphenyldecyl phosphite at 60° C. Into this mixture, 88 parts by weight of the hardening agent methylhexahydrophthalic-acid anhydride, which is liquid at room temperature, is mixed. For better mixing, this mixture is held at 40° C.±5° C.

Preparation of the Casting Resin Compound 100 parts by weight of component A are homogeneously mixed at room temperature with 122 parts by weight of component B (40° C.±5° C.) and, if indicated, vented.

EXAMPLE 5

Casting Resin Premixture (Component A)

Hexahydrophthalic-acid diglycidyl ester with an epoxy value of 0.65±0.01 mol/100 g.

Preparation of the Casting Resin Premixture (Component B)

13 parts by weight of the acid ester, prepared from 1 mol 3-methyl pentane diol-1,5 and 2 mol hexahydrophthalic-acid anhydride (the ester is melted at 90° C.) are mixed with 6 parts by weight zinc octoate and 7 parts by weight diphenyldecyl phosphite at 60° C. To this mixture 85 parts by weight of the hardening agent hexahydrophthalic-acid anhydride, which is melted at 80° C., are admixed. This mixture is cooled down to 40° C.±5° C.

Preparation of the Casting Resin Compound 100 parts by weight of compound A are homogeneously mixed with 111 parts by weight of component B (40° C.±5° C.) and, if indicated, vented.

EXAMPLE 6

Casting Resin Premixture (Component A)

Hexahydrophthalic-acid diglycidyl ester with an epoxy value of 0.65±0.01 mol/100 g.

Preparation of the Casting Resin Premixture (Component B)

29 parts by weight of the acid ester prepared from 1 mol tri-methylol propane and 3 mol dodecenyl succinic-acid anhydride (the ester is melted at 60° C.) are homogeneously mixed at 60° C. with 6 parts by weight zinc octoate and 7 parts by weight diphenyldecyl phosphite. Into this mixture are mixed 140 parts by weight of the hardening agent dodecenyl succinic acid anhydride, which is liquid at room temperature. This mixture is cooled down to room temperature.

Preparation of the Casting Resin Compound 100 parts by weight of component A are homogeneously mixed at room temperature with 182 parts by weight of component B and, if indicated, vented.

EXAMPLE 7

Casting Resin Premixture (Component A)

Hexhydrophthalic-acid diglycidyl ester with an epoxy value of 0.65±0.01 mol/100 g.

Preparation of the Casting Resin Premixture (Component B)

48.5 parts by weight of the acid ester, prepared from 1 mol castor oil and 1 mol hexahydrophthalic-acid anhydride are mixed homogeneously at 30° C.±5° C. with 6 parts by weight zinc octoate and 7 parts by weight diphenyldecyl phosphite. Into this mixture are admixed 80.5 parts by weight of the hardening agent hexahydrophthalic-acid anhydride, melted at 80° C. This mixture is cooled down to room temperature.

Preparation of the Casting Resin Compound 100 parts by weight of component A are homogeneously mixed at room temperature with 142 parts by weight of component B and, if indicated, vented.

EXAMPLE 8

Casting Resin Premixture (Component A)

Tetrahydrophthalic-acid diglycidyl ester with an epoxy value of 0.61±0.01 mol/100 g.

Preparation of the Casting Resin Premixture (Component B)

14 parts by weight of the acid ester hexhydrophthalic-acid monoethyl ester (if it is crystallized, it is melted down at 35° to 40° C.) are mixed at room temperature with 6 parts by weight zinc octoate and 7 parts by weight diphenyldecyl phosphite. To this mixture are admixed 78 parts by weight of the hardening agent hexahydrophthalic-acid anhydride, melted at 80° C. This mixture is cooled down to room temperature.

Preparation of the Casting Resin Compound 100 parts by weight of component A are homoegeneously mixed at room temperature with 105 parts by weight of component B and, if indicated, vented.

TABLE

PROPERTY DATA OF THE HARDENED MOLDED MATERIAL

| Example | Gelling Time at 120° C. | Bending Strength (N/mm²) DIN 53 452 | Bending Angle (Degrees) DIN 53 452 | Impact Strength (Nmm/mm²) DIN 53 453 | Martens Temperature (°C.) DIN 53 458 |
|---|---|---|---|---|---|
| 1 | 1' 35" | 131 | 18 | 12,4 | 84 |
| 2 | 1' 40" | 150 | 20 | 10 | 81 |
| 3 | 1' 40" | 140 | 24 | 13,3 | 79 |
| 4 | 0' 32" | 137 | 23 | 10 | 82 |
| 5 | 1' 27" | 119 | 22 | 7,7 | 83 |
| 6 | 1' 11" | 83 | 26 | 6,5 | 44 |
| 7 | 1' 53" | 117 | 30 | 10 | 48 |
| 8 | 3' 40" | 132 | 20 | 8,5 | 64 |

What is claimed is:

1. A quick-setting epoxy resin compound comprising diglycidyl ester, carboxylic-acid anhydride and, as an accelerator, zinc octoate dissolved in a low molecular weight acid ester.

2. The epoxy resin compound of claim 1 further comprising an organic phosphorus compound.

3. The epoxy resin compound of claim 1 wherein said diglycidyl ester is selected from hexahydrophthalic-acid diglycidyl ester and derivatives thereof.

4. The epoxy resin compound of claim 1 wherein said diglycidyl ester is selected from phthalic-acid diglycidyl ester and derivatives thereof.

5. The epoxy resin compound of claim 1 wherein said diglycidyl ester is a tetrahydrophthalic-acid diglycidyl ester.

6. The epoxy resin compound of claim 1 wherein said diglycidyl ester is an aliphatic diglycidyl ester.

7. The epoxy resin compound of claim 1 wherein said low molecular weight acid ester is hexhydrophthalic-acid monoethyl ester.

8. The epoxy resin compound of claim 1 wherein said low-molecular acid ester is a compound of the formula

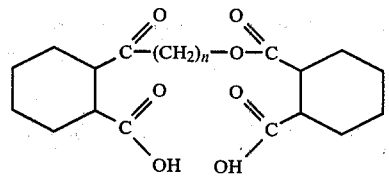

where n=1 to 4.

9. An epoxy resin compound according to claim 8 wherein said organic phosphorus compound is a phosphite.

* * * * *